No. 738,099. PATENTED SEPT. 1, 1903.
W. A. CHURCH.
INCANDESCENT LAMP SOCKET.
APPLICATION FILED JUNE 20, 1902.
NO MODEL. 2 SHEETS—SHEET 1.
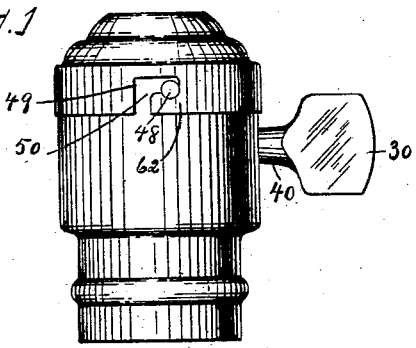
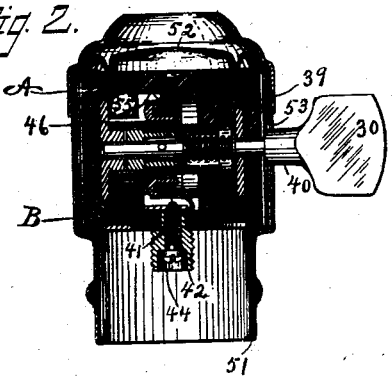
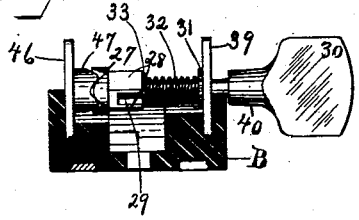
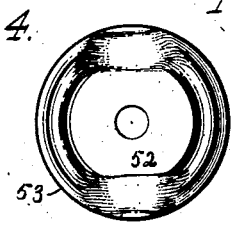
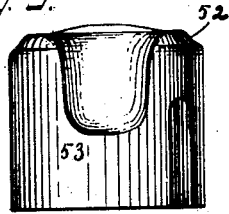
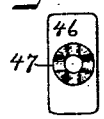
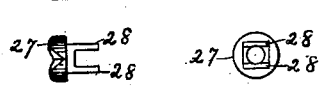
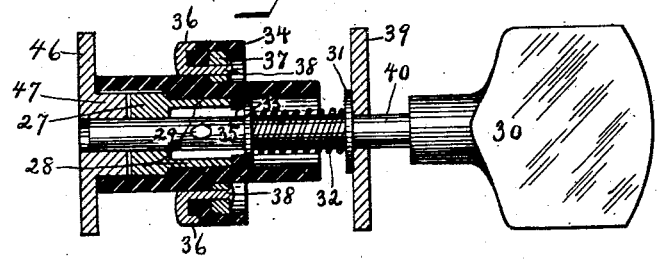
Witnesses.
S. H. Clarke
P. J. Egan
Inventor.
Walter A. Church.
By James Shepard
Atty No. 738,099. PATENTED SEPT. 1, 1903.
W. A. CHURCH.
INCANDESCENT LAMP SOCKET.
APPLICATION FILED JUNE 20, 1902.
NO MODEL. 2 SHEETS—SHEET 2.
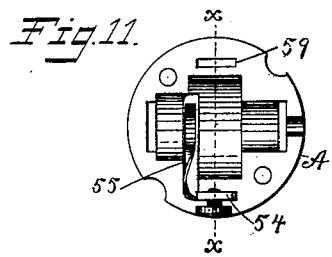
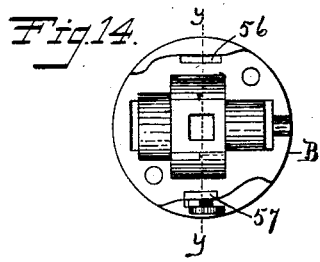
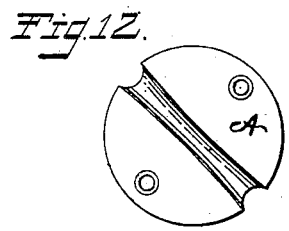
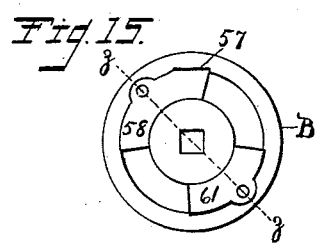
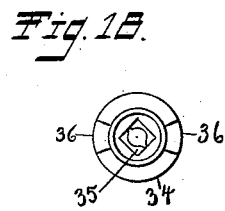
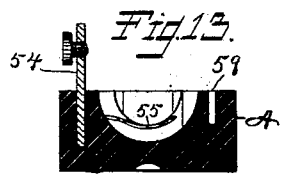
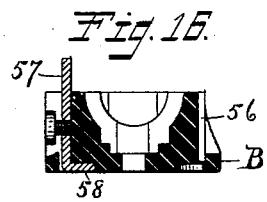
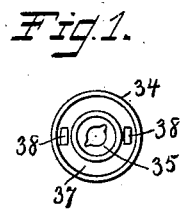
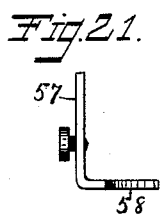
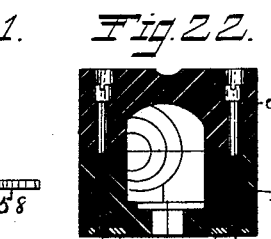
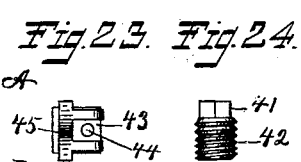
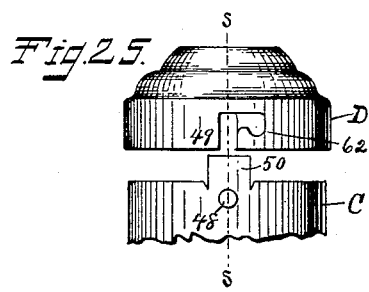
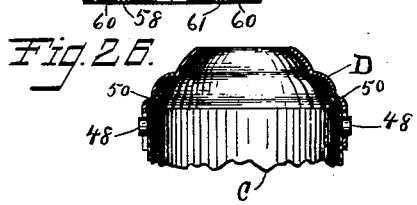
Witnesses.
S. H. Clarke
P. J. Egan
Inventor.
Walter A. Church.
By James Shepard.
Atty.

No. 738,099. Patented September 1, 1903.

UNITED STATES PATENT OFFICE.

WALTER A. CHURCH, OF BINGHAMTON, NEW YORK, ASSIGNOR TO THE BRISTOL BRASS & CLOCK COMPANY, OF BRISTOL, CONNECTICUT, A CORPORATION OF CONNECTICUT.

INCANDESCENT-LAMP SOCKET.

SPECIFICATION forming part of Letters Patent No. 738,099, dated September 1, 1903.

Application filed June 20, 1902. Serial No. 112,442. (No model.)

*To all whom it may concern:*

Be it known that I, WALTER A. CHURCH, a citizen of the United States, residing at Binghamton, in the county of Broome and State of New York, have invented certain new and useful Improvements in Incandescent-Lamp Sockets, of which the following is a specification.

My invention relates to improvements in incandescent-lamp sockets; and the main objects of my improvement are simplicity and economy in construction and convenience and efficiency in use.

In the accompanying drawings, Figure 1 is a side elevation of my lamp-socket. Fig. 2 is a vertical section of the same, partly in elevation, the same being taken on the line of the axis of the thumb-turn shaft. Fig. 2ª is a duplication of some of the central parts of Fig. 2 enlarged and arranged by themselves for the more convenient application of the reference-numerals. Fig. 3 is a sectional view of the lower insulating-block, together with a side elevation of the parts immediately connected with the thumb-turn shaft. Figs. 4 and 5 are respectively a plan view and side elevation of the insulating-jacket for the body of the socket. Fig. 6 is a side elevation of the lower member of the insulating-jacket. Fig. 7 is a face view of the stationary cam and shaft bearing. Figs. 8, 9, and 10 are respectively a face, side, and rear view of the rotating cam for the thumb-turn shaft. Figs. 11, 12, and 13 are respectively a bottom, top, and sectional view of the upper one of the insulating-blocks, together with one of the connections and spring-contacts, the plane of section for Fig. 13 being indicated by the line *x x*, Fig. 11. Figs. 14, 15, and 16 are respectively a plan, bottom, and sectional view of the lower one of the insulating-blocks, together with one of the connections and the two nuts for the screws that hold the two blocks together, the plane of the section for Fig. 16 being indicated by the line *y y*, Fig. 14. Figs. 17, 18, and 19 are respectively a side elevation and opposite end views of the rotary switch-head. Figs. 20 and 21 are respectively a side and edge view of one of the connections and nut formed integral therewith. Fig. 22 is a sectional view of the two insulating-blocks on the line *z z* of Fig. 15, together with a side elevation of the holding-screws and sectional view of the nuts for the said screws. Fig. 23 is a plan view of the lower spring-contact, together with the nut and screw for holding it in the socket. Fig. 24 is a side elevation of the hollow screw for the lower insulating-block. Fig. 25 is a side elevation of the upper end of the case and its cap. Fig. 26 is a sectional view of the same on the line *s s* of Fig. 25, the parts being together.

As in ordinary lamp-sockets of this class the parts are mainly mounted in or on two insulating-blocks or half-sockets, of which A designates the upper and B the lower one of the said blocks. I use the words "upper" and "lower" for convenience of description and only with reference to the position shown in Figs. 1 and 2, being well aware that in use the complete socket may be placed either end up. Both of these blocks are properly recessed to receive the parts hereinafter described, and I consider it unnecessary to describe in detail these recesses further than that they receive and in some instances act to confine certain parts and that the recesses to receive the parts connected with the thumb-turn shaft are in the confronting faces of the said blocks.

The bearing-plate 39 for the thumb-turn shaft 40 and the bearing-plate 46, with combined stationary cam 47, have their ends received and held in the two blocks for forming proper journal-bearings for the said thumb-turn shaft 40. A rotary and sliding cam 27, having four alternate projections and elevations on its side face, rounded or beveled in both directions for engaging the counterpart of the said side cam-face on the fixed cam-face 47, is mounted on the thumb-turn shaft. As shown, it has a square shank, which is forked or slotted, so as to form two members 28 for the pin or key 29 on the shaft 40 to enter and necessitate a rotary motion of the said cam with the said shaft whenever the said shaft is turned a complete quarter of a revolution. The pin or key, however, does not fill the slot in the shank of the cam, whereby there is a degree of lost motion to enable the cam to advance with a snap in the ordinary manner of snap-switches for lamp-sockets and other devices. The slot for the pin is also long enough to permit the cam to slide longitudinally on the shaft 40 to have the cam-faces of the two cams engage and disengage each other by moving longitudinally on the said shaft when rotated. The shaft 40 is provided with the usual thumb-turn 30 and a fixed shoulder or washer 31 for contact with the inner face of the bearing-plate 39. A spring 32 and loose collar or washer 33 are also placed on the shaft 40, with the said collar or washer bearing indirectly on the rear end of the cam and the spring in between the said two collars 31 and 33. When these parts are placed in the position shown in Fig. 3, the spring is held under tension, acting to force the faces of the two cams together. It will readily be seen that turning the shaft 40 in either direction will after the pin or key on the shaft comes into engagement with the slotted portion of the cam rotate the said cam with the said shaft. The engaging rounded projections of these cams as they ride over each other will force the rotary and sliding cam longitudinally on the shaft 40 until the summits of the said projections are ready to pass each other, when the rotating and sliding cam will move forward with a combined rotary and longitudinal movement under the influence of the spring 32. For purposes of illustration I have shown these parts in Fig. 3 without the rotating switch-head that belongs therewith.

The rotary switch-head 34 is mainly formed of insulating material and is recessed axially to receive the cams 47 27 and spring 32. This axial hole in the switch-head is squared at the part which receives the squared shank and two members 28 of the cam 27, so as to necessitate a rotary movement of the switch-head with the said cam. I also prefer to form in this hole an interior flange or shoulder 35, upon one side of which the end of the cam-shank may bear, while the washer or loose collar 33 on the thumb-turn shaft is forced against the other shoulder or face of this flange 35 under the tension of the spring 32, whereby the combined rotary and sliding movement of the cam hereinbefore described is imparted to the switch-head. This flange may be notched, as shown in Figs. 18 and 19, in order to permit the key 29 of the thumb-turn shaft to pass through it into the interior of the slotted shank of the cam 27. This switch-head is provided with two contacts 36. The said contacts are electrically connected by means of an annular plate 37, let into an annular recess on one side of the switch-head and provided with two holes, into which the shanks 38 of the contacts are riveted, as shown in Figs. 2 and 19, the shanks of the said contacts passing through the said switch-head, as shown in Figs. 2 and 2ª.

In the center of the lower insulating-block B at the bottom there is a square hole into which the squared neck 41 of the hollow screw 42 is received. There is also a nut 43 within the block B above the squared hole. A screw 44 extends upwardly through the hollow screw 42 into the said nut, as shown in Fig. 2. The lower spring-contact 45 (shown separately in Fig. 23) lies over this nut 43, with its shank under the nut, so as to be held in place by being clamped between the nut and bottom of the recess in the block B, as shown in Fig. 2. The upper block A is so recessed as to receive into it the connection 54 for one of the wires and also the upper spring-contact 55, which is attached to the said connection. The lower end of the connection 54 is received in the recess 56 of the block B. In the block B is the connection 57 for the other wire, and the nut 58 is made integral with the said connection. The upper end of this connection is received in the recess 59 of the block A. The two blocks and inclosed parts are held together by the screws 60, which pass through the two blocks and into the nuts 58 and 61 on the under side of the lower block B. The switch between the two spring-contacts will connect and disconnect the hollow screw 42 and the connection 54. This socket in the particular form shown is designed for a lamp having an internally-threaded socket to be screwed upon the hollow screw 42, and connection with the lamp will be made through the said hollow screw and center of the lamp and through the nut 61 and a ring or other pieces at the upper end of the lamp.

The case C and its cap D are in the main of an ordinary construction and are provided with the usual pins 48 and elbow-slots 49, which form the ordinary bayonet-joint, the elbow-slots having slight recesses 62 on the bottom side at their inner ends, as shown in Fig. 25. The upper end of the case is provided with two upwardly and inwardly projecting springs 50, preferably formed integral with the case. The cap D has its central portion of the usual rounded conoidal form, and the springs 50 are long enough to engage the inner face of the contracted or conoidal cap a little before the cap reaches its extreme lowest position on the case, so that the springs must be forced inwardly slightly under tension before the cap can be secured. The tension of the springs on the cap is such as to lift the cap, and thus when the cap is turned to bring the pins 48 into the horizontal portion of the slots the pins will snap into the recesses 49 under the tension of the springs 50 and lock the cap against accidental displacement as soon as the pins come into position for engagement therewith, as shown in Fig. 1. The said case and cap are for receiving and holding the two insulating-blocks and connected parts hereinbefore described, and as usual in this class of sockets there is an insulating jacket or mantle between the blocks and the case; but heretofore this mantle has been made in three parts, two tubular parts and a cap. In my mantle the tubular part 51 for the neck of the case is of the usual form, while the cap is made with a closed end 52 and cylindrical sides 53, the latter being long enough to line the larger part of the case, as shown in Fig. 2.

It is apparent that some changes from the specific construction herein disclosed may be made, and therefore I do not wish to be understood as limiting myself to the precise form of construction shown and described, but desire the liberty to make such changes in working my invention as may fairly come within the spirit and scope of the same.

By my improvement the thumb-turn shaft is completely insulated, the action of the parts is quick and easy, the shaft may be turned in either direction, and when turned the proper distance the switch will automatically take its proper position without the necessity of taking pains to stop the shaft with precision at any particular point.

I claim as my invention—

1. In a lamp-socket, the combination of the thumb-turn shaft with the two separate insulating-blocks in the form of half-sockets, the stationary cam mounted on the lower one of the said blocks and having a side face composed of alternate elevations and depressions rounded or beveled in both directions, the rotary and sliding cam having a similar confronting side face, a spring for holding the said cam-faces into engagement, a switch-head mounted on the said rotary and sliding cam and contacts for said switch-head, one contact being within one of the said blocks and the other within the other of the said blocks, substantially as described.

2. In a lamp-socket, the combination of the insulating-blocks with the thumb-turn shaft mounted in proper bearings therein, the stationary side cam in a fixed position relatively to the said blocks, the rotary and sliding cam coacting therewith, the switch-head mounted on the said rotary and sliding cam and recessed from one end to receive and cover the said rotating and sliding cam, also deeply recessed from its opposite end and having the internal flange 35 between the recesses of the said two ends, the spring 32 and the washer 33 resting on the said flange within one of the recessed ends of the said switch-head, substantially as described.

3. In a lamp-socket, the combination of the thumb-turn shaft with insulating-blocks, the stationary side cam in a fixed position relatively to said blocks and having alternate elevations and depressions rounded off in both directions, the rotary and sliding cam having a similar confronting face, a pin-and-slot connection between the said cam and thumb-turn shaft for positively rotating the said cam, a spring for holding the said cam-faces in engagement with each other, and a switch-head mounted on the said rotary and sliding cam, whereby the switch may be operated by turning the said thumb-turn shaft in either direction.

4. In a lamp-socket, the combination of the thumb-turn shaft with the stationary cam having the side face, the rotary and sliding cam having a side face for acting against the said stationary cam and having the two members 28, a pin 29 on the thumb-turn shaft for working between the said two members 28 of the cam, a spring for forcing the said cams together and a rotary switch-head mounted on the said rotary and sliding cam with the said two members 28 received in a squared recess of the said switch-head, substantially as described.

5. In a lamp-socket, the combination of the case having the pins 48 and the springs 50 extending upwardly from the end of the said case and the cap D having a dome-shaped top and a body having the elbow-slots with slight recesses 62 for engaging the said pins, the said springs 50 being fitted to the inside of the said cap and to bear upon the inner wall of its dome, substantially as described.

6. In a lamp-socket, a sectional base, each section provided with recesses adapted to register with the recesses of the opposite section with the parts in place, a switch having a main body portion of cylindrical form and tubular necks extending from opposite sides thereof, said body portion being located in one of the recesses with the tubular necks extending into adjacent recesses and forming a closure for the recess occupied by the cylindrical body portion, and means for rotating said body portion.

7. In a lamp-socket, a sectional base each section having recesses adapted to register with the recesses of the opposing body portion when in place and forming interconnected chambers, a switch having a main body portion located in one of said chambers and provided with necks protruding into the adjacent connecting-chambers and forming a closure for the chamber of the central body portion, a contact arranged in the said body portion, and coöperating contacts located in the chamber of the body portion.

8. In a lamp-socket, the combination of the thumb-turn shaft with the two separate insulating-blocks in the form of half-sockets, the stationary cam mounted on the lower one of the said blocks and having a side face composed of alternate elevations and depressions, the rotary and sliding cam having a coöperating side face, a spring for holding the said cam-faces into engagement, a switch-head mounted on the said rotary and sliding cam and contacts for said switch-head, one contact being within one of the said blocks and the other within the other of the said blocks, substantially as described.

9. In a lamp-socket, a sectional base each section provided with recesses adapted to register with the recess of the opposing section with the parts in place, a switch having a main body portion bearing contacts and necks extending from opposite sides thereof, said body portion being located in one of the recesses and the necks extending into adjacent recesses and forming an insulated closure for the recess occupied by the body portion and contacts, and means for rotating the body portion.

10. In a lamp-socket, a sectional base each section having recesses adapted to register with the recesses of the opposing body portion when in place and forming interconnected chambers, a switch having a main body portion bearing contacts located in one of said chambers and provided with necks protruding into the adjacent connecting-chambers and forming a closure for the chamber of the central body portion, a switch-spindle and cams intermediate the spindle and body portion for rotating the latter, said cams being arranged within one of the necks, and contacts located in the chamber of the body portion and coöperating with the contacts of the body portion.

11. In a lamp-socket, a sectional base each section having recesses adapted to register with the recesses of the opposing body portion when in place and forming interconnected chambers, a switch having a main body portion located in one of said chambers and provided with necks projecting beyond and forming a closure for the chamber of the central body portion, contacts in the body portion and coöperating contacts in the chamber of the body portion, a switch-spindle and actuating mechanism for moving the body portion, said mechanism inclosed by the protruding necks and adjacent interconnected chambers.

12. In a lamp-socket, a sectional base each section having a series of recesses adapted to register with corresponding recesses of an opposing section when in place and forming interconnected chambers, a switch-body bearing contacts arranged in one chamber and provided with necks protruding into adjacent chambers and forming a closure for the chamber of the switch-body, operating mechanism for the switch-body arranged within the chambers adjacent to the switch-body chamber and inclosed by the projecting necks, and contacts operatively mounted in the switch-body chamber and coöperating with the contacts of the switch-body.

WALTER A. CHURCH.

Witnesses:
S. B. HARPER,
GEO. C. DOHERTY.